United States Patent [19]

Barree

[11] Patent Number: 4,846,215
[45] Date of Patent: Jul. 11, 1989

[54] BACK PRESSURE REGULATOR

[75] Inventor: Robert D. Barree, Littleton, Colo.

[73] Assignee: Marathon Oil Company, Findlay, Ohio

[21] Appl. No.: 203,670

[22] Filed: Jun. 7, 1988

[51] Int. Cl.$^4$ ............................................. F16K 7/17
[52] U.S. Cl. .................................. 137/510; 137/859; 137/906
[58] Field of Search ..................... 137/510, 859, 906; 251/61.1

[56] References Cited

U.S. PATENT DOCUMENTS

| | | | |
|---|---|---|---|
| 2,677,390 | 5/1954 | Davis et al. | 251/61.1 X |
| 2,902,048 | 9/1959 | Ryan | 137/510 |
| 3,030,801 | 4/1962 | Allen | 73/38 |
| 3,078,066 | 2/1963 | Moore | 137/510 X |
| 3,199,341 | 8/1985 | Heuer, Jr. et al. | 73/38 X |
| 3,642,026 | 2/1972 | Sielaff | 137/859 |
| 3,748,836 | 7/1973 | Bachle | 251/61.1 X |
| 3,807,430 | 4/1974 | Keller | 137/859 X |
| 4,037,784 | 7/1977 | Sabarly | 137/859 X |
| 4,221,361 | 9/1980 | Weingarten | 251/61.1 X |
| 4,304,260 | 12/1981 | Turner et al. | 251/61.1 X |
| 4,376,523 | 3/1983 | Goyen | 251/61.1 |
| 4,555,934 | 12/1985 | Freeman et al. | 73/38 |
| 4,679,421 | 7/1987 | Barree | 73/38 |

OTHER PUBLICATIONS

W. W. Owens, D. R. Parrish, and W. E. Lamoreaux, "An Evaluation of a Gas Drive Method for Determining Relative Permeability Relationships", Petroleum Transactions, AIME, vol. 207, 1956, pp. 275–280.
S. C. Jones and W. O. Roszelle, "Graphical Techniques for Determining Relative Permeability from Displacement Experiments", Jour. of Petroleum Technology, May 1978, pp. 807–817.
Literature References for Specifications of Commercially Available Apparatus.

Primary Examiner—Stephen Hepperle
Attorney, Agent, or Firm—Jack L. Hummel

[57] ABSTRACT

A back pressure regulator of the diaphragm type. A metal diaphragm is held in a cavity formed by opposed faces of top and bottom portions of the unit. The opposed faces are tapered so that the depth of the cavity is greatest in the central portion of the diaphragm, allowing for movement of the diaphragm. A fluid outlet leading into the cavity at the underside of the diaphragm is sealed by contact of the underside of the diaphragm with an O-ring which surrounds the fluid outlet and extends into the cavity. When the pressure of the fluid in the cavity above the diaphragm is greater than the pressure of the fluid beneath the diaphragm the diaphragm is maintained in contact with the O-ring to prevent flow through the outlet.

6 Claims, 4 Drawing Sheets

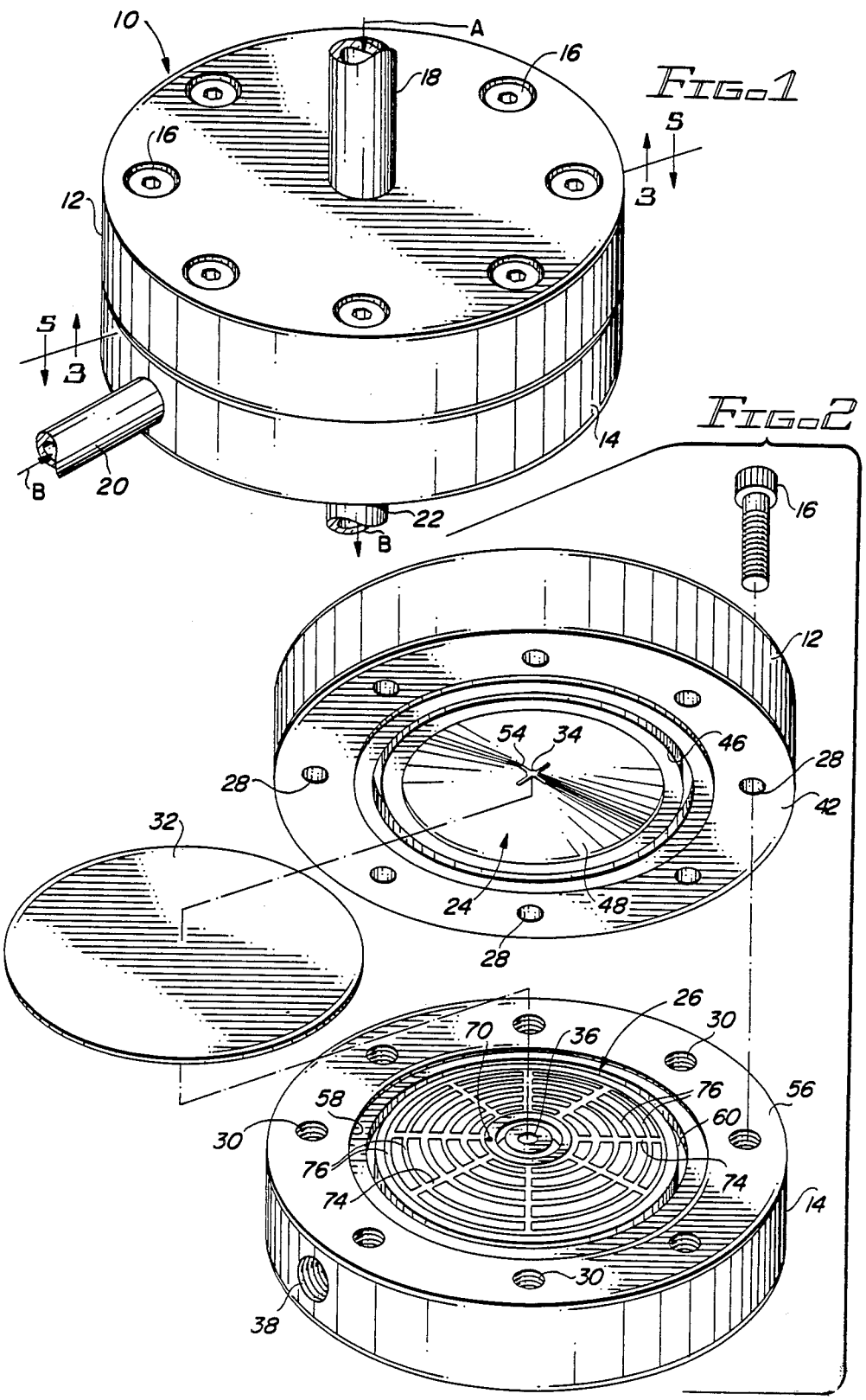

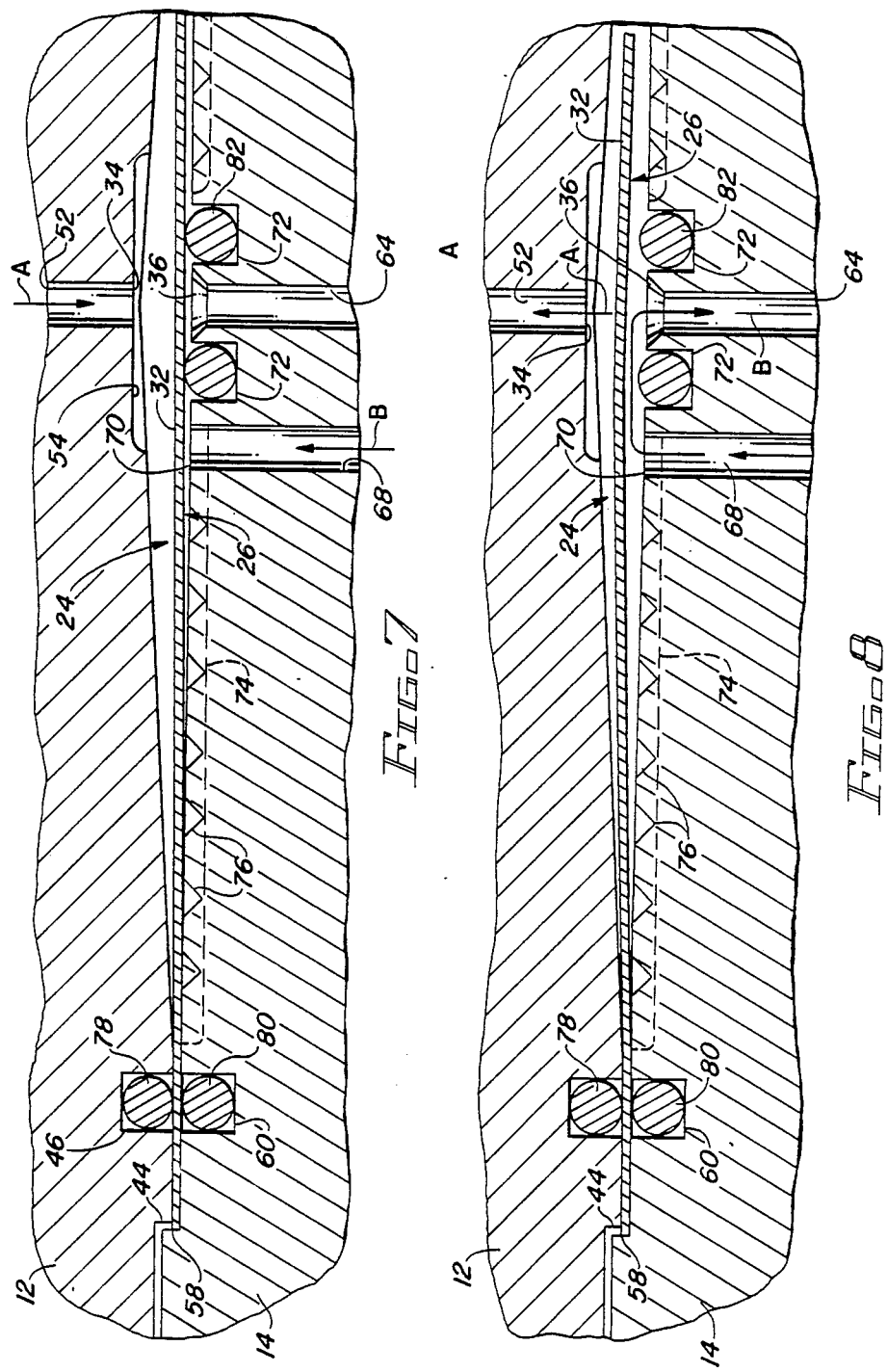

4,846,215

BACK PRESSURE REGULATOR

FIELD OF THE INVENTION

This invention relates to back pressure regulators. More particularly, it relates to a back pressure regulator of the diaphragm type.

BACKGROUND OF THE INVENTION

In the measurement of flow rates of potentially corrosive fluids in low volume systems such as those used in laboratory work it is common to control the pressure of the fluid by back pressure regulation. This entails exposing one side of a diaphragm to an inert gas at a predetermined fluid pressure while the other side of the diaphragm is exposed to the fluid in the system. The diaphragm, which is normally formed of rubber or other material capable of providing a sealing function, seals an outlet which prevents the flow of the system fluid. When the pressure of the system fluid exceeds the predetermined pressure the diaphragm is lifted from its sealing engagement with the fluid outlet, allowing the fluid to flow through the system.

In such an arrangement the relatively soft diaphragm is subject to deformation by the fluid pressures encountered and in time is no longer as sensitive to pressure changes. In addition, its compressible nature results in a high hysteresis effect, which is especially undesirable in a low volume laboratory system dependent upon rapid response to pressure changes in order to provide accurate fluid pressure control.

It would be desirable to have a back pressure regulator which quickly and accurately responds to pressure changes in a uniform consistent manner over a long period of time, and which is not subject to undesirably high hysteresis effects. It would also be desirable, particularly when used in a low volume laboratory system, for the regulator to use a diaphragm the properties of which do not change over extended use and which has a minimal fluid displacement.

SUMMARY OF THE INVENTION

The back pressure regulator of this invention comprises a body portion containing spaced opposed faces which form a cavity therebetween and a diaphragm held in place about its periphery in the cavity. One of the faces contains a first fluid inlet through which a reference fluid under predetermined pressure can be introduced into the cavity on one side of the diaphragm. The other face contains a second fluid inlet through which the system fluid can be introduced into the cavity on the other side of the diaphragm. The other face also contains a fluid outlet through which system fluid at the desired pressure can flow. Sealing means contacts the other side of the diaphragm when the pressure of the reference fluid exceeds the pressure of the system fluid to seal the fluid outlet against flow from the second fluid inlet.

In a preferred embodiment the sealing means comprises an O-ring which surrounds the fluid outlet and extends up from the other face of the cavity so that the underside of the diaphragm engages the O-ring until the pressure of the system fluid reaches the desired level and moves the diaphragm out of contact with the O-ring. The diaphragm preferably is comprised of metal, such as stainless steel, which allows small movements of the diaphragm to maintain the system under constant fluid pressure. The face through which reference fluid is introduced into the cavity is tapered toward the center of the cavity in a direction away from the diaphragm to provide space for the diaphragm to flex smoothly over its entire diameter. Because the pressurized area of the diaphragm is large relative to the unbalanced area at the outlet and because the diaphragm is thin and deforms easily under pressure, hysteresis effects during opening and closing of the outlet valve are minimized.

This arrangement allows the internal volume on the system side of the diaphragm to be low and volume changes during regulation to be small. The tapered cavity and the small displacements of the diaphragm allow the regulator to withstand great pressure imbalances, in the order of several thousand psi, with no damage. Further, the diaphragm is not subject to "coining", as are diaphragms formed of Teflon and other polymeric materials which tend to flow or deform under high pressures.

It is noted that some features of the invention are described in U.S. Pat. No. 4,679,421, issued on July 14, 1988 in the name of Robert D. Barree, in connection with an automated gas-liquid relative permeameter.

Other features and aspects of the invention, as well as other benefits of the invention, will readily be ascertained from the more detailed description of the invention which follows.

BRIEF DESCRIPTION OF THE DRAWINGS

FIG. 1 is a pictorial view of the back pressure regulator of the present invention;

FIG. 2 is an exploded view of the back pressure regulator of FIG. 1;

FIG. 7 is an enlarged transverse sectional view taken through the center of the regulator, showing the diaphragm when the pressure of the reference fluid is greater than that of the system fluid; and FIG. 8 is an enlarged transverse sectional view similar to that of FIG. 7, but showing the diaphragm when the pressure of the reference fluid is less than the pressure of the system fluid.

DESCRIPTION OF THE PREFERRED EMBODIMENT

Figure 3:
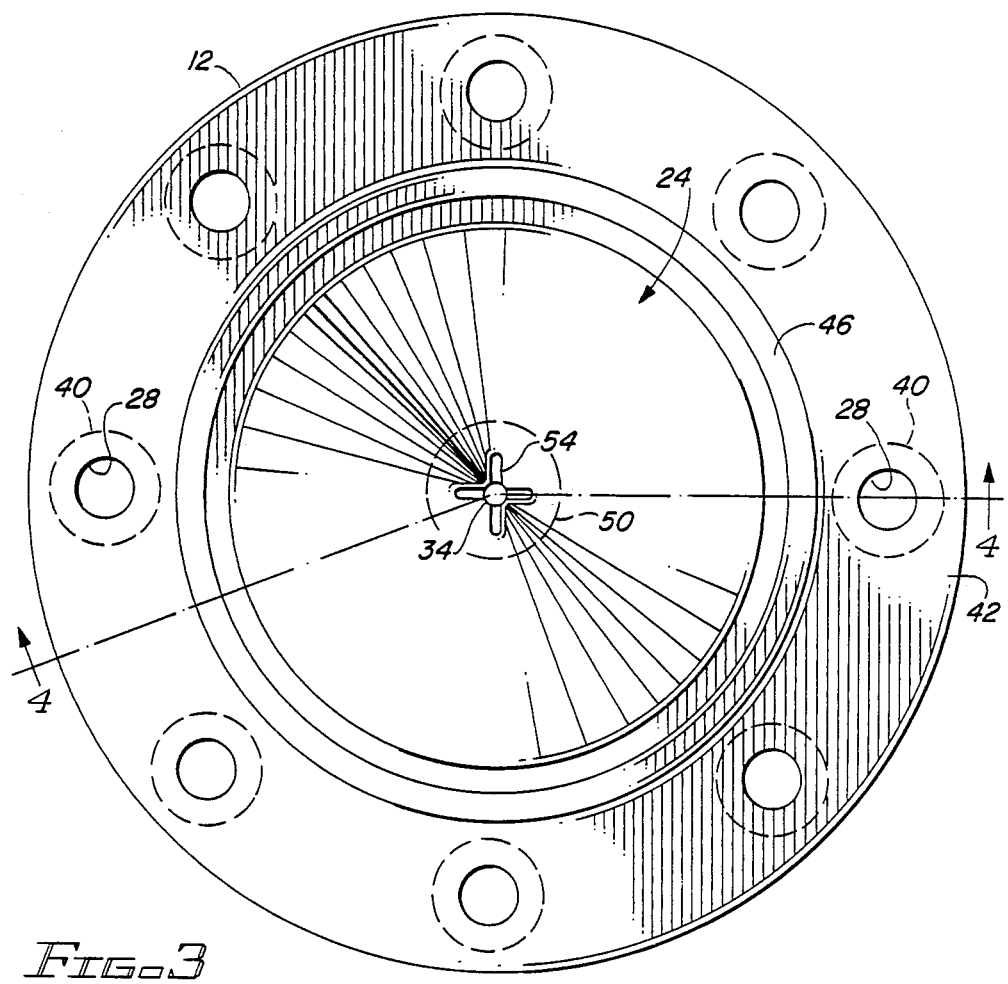
FIG. 3 is a plan view of the lower face of the top portion of the regulator body.

Referring to FIG. 1, the back pressure regulator 10 of the present invention is comprised of a cylindrical top portion 12 connected to a cylindrical bottom portion 14 of equal diameter by suitable means such as bolts 16. A fluid inlet line 18 connects the top portion 12 with a reference fluid A, such as nitrogen, which is under a predetermined pressure. Another fluid inlet line 20 connects the bottom portion of the regulator with the system fluid B, which may be either gas or liquid. A fluid outlet line 22 connects the bottom portion 14 with the system fluid B.

As shown in FIG. 2, the lower face of the top portion 12 contains a recess 24 and the upper face of the bottom portion 14 contains a recess 26. When the top and bottom portions 12 and 14 are bolted together through aligned bolt holes 28 and 30 the adjoining recesses 24 and 26 form a cavity in the central portion of the regulator body. A diaphragm 32 fits in the cavity in a manner described in more detail hereinafter. A fluid inlet 34 can be seen at the center of the recess 24 in the top body portion 12, and a fluid outlet 36 can be seen in the center of the recess 26 in the bottom body portion 14. The port to which the line 20 is connected is indicated at 38.

Figure 4:
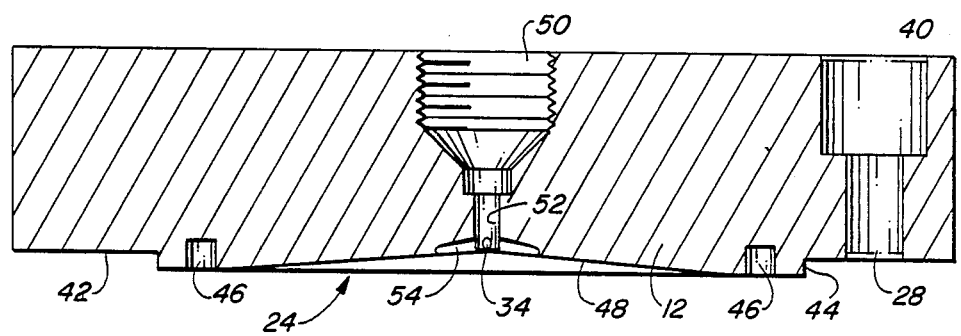
FIG. 4 is an enlarged sectional view taken on line 4—4 of FIG. 3.

The top portion of the regulator is shown in more detail in FIG. 3, which shows the lower surface of the top body portion 12, and in FIG. 4, which shows the top body portion 12 in inverted position. The bolt holes 28, which are spaced uniformly around the periphery of the top body portion, may be countersunk as at 40 to receive the bolt heads. The peripheral portion of the top body portion 12 in which the bolt holes are located is indicated at 42 and is connected by shoulder 44 to the slightly thicker central part of the body portion 12. Located radially inwardly of the shoulder 44 is a groove 46 for receiving a sealing ring, not shown in these views. Starting a short distance radially inwardly of the groove 46 and continuing to the center of the unit, the lower face of the top portion 12 is dished or tapered as at 48 to produce the recess 24. The inlet 34 connects with the lower face of the top body portion 12 at the center of the recess 24. Although the degree of taper may vary according to design, it has been found that with a stainless steel diaphragm a taper in the order of 3° provides sufficient room for the diaphragm to flex properly without permanent deformation and allows the cavity to withstand high operating pressures. A port 50 in the upper face of the top portion 12 is adapted to receive the inlet line 18 shown in FIG. 1 and is connected to the inlet 34 by bore 52. Extending laterally from the inlet 34 are short grooves 54 which function to more uniformly disperse the reference gas entering the cavity through the inlet 34 and to ensure that the inlet port 50 is not blocked by the diaphragm.

Figure 5:
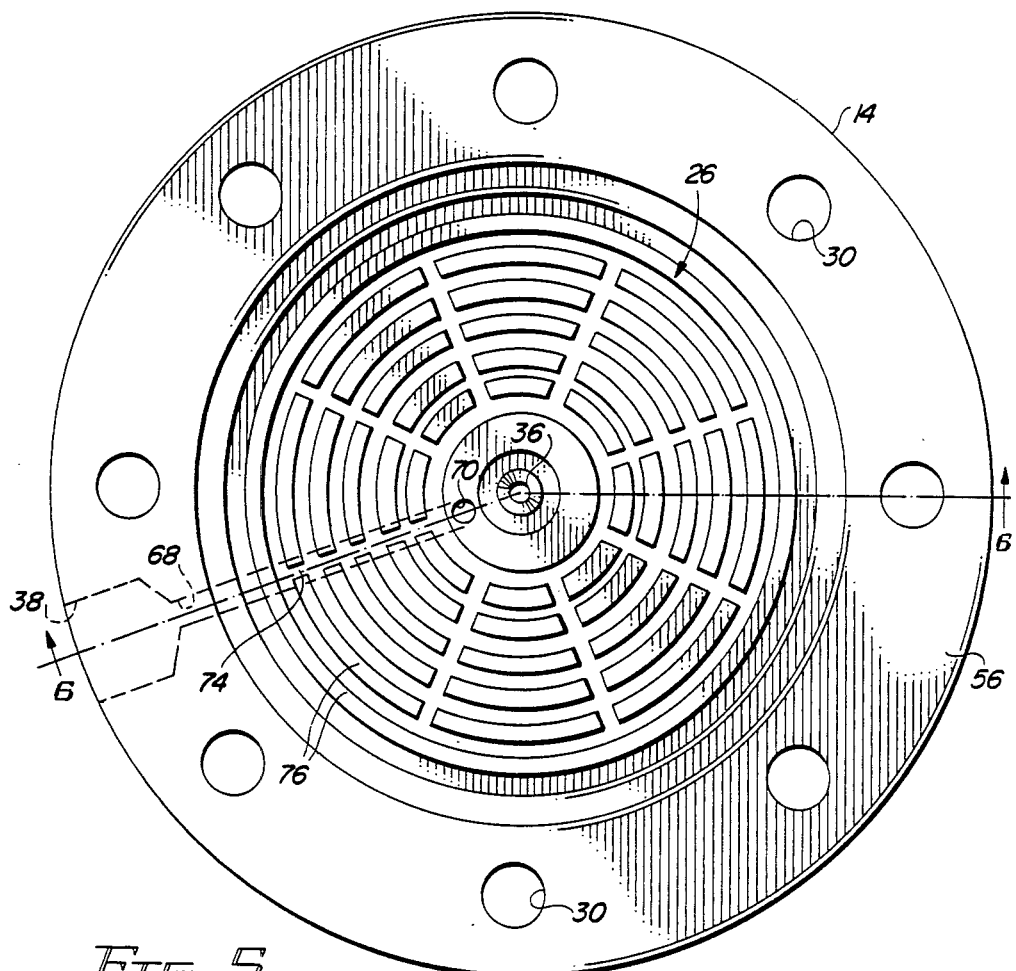
FIG. 5 is a plan view of the upper face of the bottom portion of the regulator body.
Figure 6:
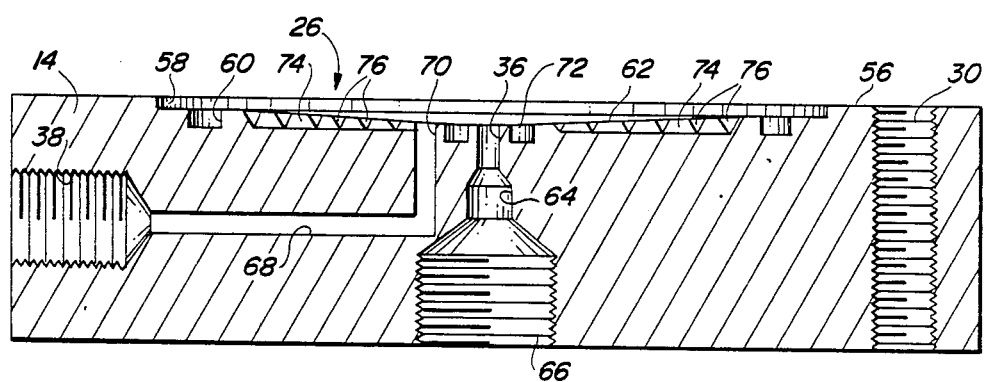
FIG. 6 is an enlarged sectional view taken on line 6—6 of FIG. 5.

Referring now to FIGS. 5 and 6, the bottom portion 14 of the regulator includes a peripheral section 56 through which the bolt holes 30 extend and which is adapted to abut the peripheral portion 42 of the top body portion 12. A shoulder 58 extends downward from the inner extent of the peripheral section 56. Radially inwardly of the shoulder 58 is a continuous groove 60 in which a sealing ring, not shown in these views, is adapted to seat. The groove 60 is aligned with the groove 46 in the top body portion 12 when the top and bottom portions are connected together, as will be made more clear hereinafter. Beginning a short distance radially inwardly of the groove 60 the upper face of the bottom body portion 14 is dished or tapered as at 62 to form the recess 26. This recess is especially useful in ensuring that enough space is available for proper functioning of the diaphragm in cases where the top and bottom halves of the unit are not concentrically aligned. If they are properly aligned the unit will function without the upper face of the bottom body portion being tapered. As in the case of the recess in the top body portion, the degree of taper may vary as required. In general, however, the degree of taper need not be as great as in the top body portion. A taper of 1°, for example, has been found to provide sufficient space for the diaphragm to properly engage the sealing means adjacent the fluid outlet and to enable the cavity to withstand high pressures.

A bore 64 connects the fluid outlet 36, located in the center of the recess 26, to a port 66 to which the outlet line 22 shown in FIG. 1 is connected. In addition, a bore 68 connects the port 38 to a fluid inlet located in the recess 26 a short distance from the outlet 36. Surrounding the fluid outlet 36, and located between the outlet 36 and the inlet 70, is a groove 72 adapted to receive a sealing ring, not shown in these views. In order to better disperse the incoming fluid from the inlet 70 a number of shallow grooves 74 radiating out from points spaced a short distance from the sealing ring groove 72 are provided in the upper face of the bottom body portion 14. In addition, a number of grooves 76 concentric with the groove 72 are also provided in the upper face of the bottom body portion 14 for the same purpose.

Referring now to FIG. 7, the top and bottom body portions 12 and 14 and the diaphragm 32 are shown as they appear when assembled. An O-ring 78 seated in the groove 46 in the top body portion 12 engages the top surface of the outer peripheral portion of the diaphragm 32 while a similar O-ring 80, aligned with the O-ring 78 and seated in the groove 60 in the bottom body portion 14, engages the underside of the diaphragm at a point opposite the O-ring 78. The peripheral portion of the diaphragm is thus clamped between the opposing surfaces of the top and bottom body portions 12 and 14 in the area between the shoulders 44 and 58 and the outer extremities of the recesses 24 and 26, and the cavity formed by the recesses 24 and 26 is sealed by the O-rings 78 and 80.

Seated in the groove 72 is an O-ring 82 the relative dimensions of which cause the O-ring 82 to extend into the recess 26 a short distance beyond the upper face of the tapered section of the bottom body portion 14. Thus in the condition shown in FIG. 7, wherein the pressure of the reference gas A is greater than the pressure of the system fluid B, the diaphragm 32 contacts the O-ring 82, thereby sealing the outlet 36 from the system fluid B so that fluid cannot enter the outlet 36. The O-ring 82 would contact the diaphragm even if no taper or recess were provided in the upper face of the bottom body portion, as long as the O-ring extends up beyond the upper face a distance enabling it to contact the diaphragm. As referred to previously, if the upper and lower body portions are held in place so that their faces are concentrically arranged, such an arrangement would be a functional design.

As shown in FIG. 8, when the pressure of the system fluid B exceeds the pressure of the gas A the diaphragm 32 is lifted out of contact with the O-ring 82, allowing the system fluid B to flow into the outlet 36 and out the bore 64 to the outlet line. The grooves 74 and 76 disperse the flow of system fluid throughout the recess 26 to more uniformly apply pressure to the underside of the diaphragm 32.

The diaphragm 32 is held in place such that when in its neutral position, that is, when the cavity is not under pressure, the diaphragm will just barely touch the O-ring 82. Thus only a very small movement of the diaphragm is necessary to open or close the regulator outlet 36. During operation of the regulator small movements of the diaphragm maintain the system fluid pressure at a constant value by adjusting the space between the diaphragm and the O-ring 82. As pointed out previously, because the pressurized area of the diaphragm facing the recess 24 is large compared to the unbalanced area of the diaphragm at the outlet, and because the diaphragm is thin and deforms easily under pressure, the hysteresis effects during opening and closing of the outlet are minimized.

The diaphragm may be formed of any suitable metal or plastic that will not flow or deform under high pressure, such as rubber or Teflon will do. The material should also have the flexibility and strength required to withstand the stresses to which it is exposed during use and at the same time be able to readily deform or flex to the degree necessary under pressure. Examples of such materials are stainless steel, aluminum, brass, Hasteloy, titanium, and the like metals, and high compressive-strength plastics such as polyimide and polyether ether-ether ketones. The preferred material is stainless steel having a thickness in the order of about 0.006 inch.

Because the internal volume on the system side of the regulator is small and because volume changes during regulation are small, the regulator of the invention is ideal for small volume laboratory systems. The tapered recesses 24 and 26 and the small displacements of the diaphragm allow the regulator to withstand severe pressure imbalances up to several thousand psi without damage.

It should now be understood that the invention is not necessarily limited to all the specific details described in connection with the preferred embodiment, but that changes to certain features of the preferred embodiment which do not affect the overall basic function and concept of the invention may be made by those skilled in the art without departing from the spirit and scope of the invention, as defined in the appended claims.

What is claimed is:

1. A back pressure regulator for fluids, comprising:
   a body portion containing spaced opposed faces forming a cavity therebetween;
   the cavity comprising a recess in one of the opposed faces, the recess having a periphery and being tapered radially inwardly from said periphery and away from the other opposed face, the angle of the taper being small to provide for a gradually tapered recess the central portion of which is relatively closely spaced to the other face;
   a diaphragm in the cavity, the diaphragm being held in place about the periphery thereof;
   the thickness of the diaphragm being less than the distance between the opposed faces;
   the diaphragm being formed of material which is resistant to flow but which is able to flex when subjected to high pressures;
   a first fluid inlet in said one face through which a first fluid under predetermined pressure can be introduced into the cavity on one side of the diaphragm;
   a second fluid inlet in the other face through which a second fluid, the pressure of which is to be regulated, can be introduced into the cavity on the other side of the diaphragm;
   a fluid outlet in the other face; and
   a sealing ring comprising an O-ring adjacent to and surrounding the fluid outlet, the sealing ring extending beyond the fluid outlet, the second fluid inlet and adjacent portions of said other face in a direction toward said one face and contacting the other side of the diaphragm when the pressure of the first fluid exceeds the pressure of the second fluid to maintain the diaphragm in spaced relationship to the second fluid inlet and the fluid outlet while sealing the fluid outlet against flow from the second fluid inlet.

2. A back pressure regulator according to claim 1, wherein the diaphragm is comprised of metal.

3. A back pressure regulator according to claim 1, including grooves in the other face of the cavity for distributing the second fluid throughout the cavity between the other face of the cavity and the other side of the diaphragm.

4. A back pressure regulator for fluids, comprising:
   a top body portion having a lower face at least a portion of which is recessed;
   a bottom body portion having an upper face at least a portion of which is recessed;
   the top and bottom body portions being attached in face to face relationship so that the recessed portions thereof form a cavity between the top and bottom portions;
   a metal diaphragm between the top and bottom body portions, the diaphragm having a peripheral portion and a central portion;
   means on the top and bottom body portions clamping the peripheral portion of the diaphragm in place whereby the central portion of the diaphragm extends into the cavity;
   a fluid inlet in the top body portion communicating with the cavity;
   a fluid inlet in the bottom body portion communicating with the cavity;
   a fluid outlet in the bottom body portion communicating with the cavity;
   sealing means extending upwardly from the upper face of the bottom body portion and surrounding the fluid outlet in the bottom body portion, the diaphragm contacting said sealing means to prevent flow of fluid into the outlet in the bottom body portion when the fluid pressure on the upper side of the diaphragm exceeds the fluid pressure on the lower side of the diaphragm;
   the recess in the lower face of the top body portion being tapered radially inwardly and away from the bottom body portion, the taper allowing the diaphragm to be lifted when the fluid pressure on the lower side of the diaphragm exceeds the fluid pressure on the upper side of the diaphragm;
   the recess in the upper face of the bottom body portion being tapered radially inwardly and away from the top body portion; and
   the recesses being tapered in the range of 1°–3°.

5. A back pressure regulator according to claim 1, wherein the diaphragm is positioned so as to make minimal contact with the sealing ring when the pressures on opposite sides of the diaphragm are the same.

6. A back pressure regulator according to claim 1, wherein the angle of the taper of the recess is no more than about 3°.

* * * * *